United States Patent
Tsirkin

(10) Patent No.: US 8,533,320 B2
(45) Date of Patent: Sep. 10, 2013

(54) COALESCING NETWORK NOTIFICATIONS FOR LIVE MIGRATION

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 266 days.

(21) Appl. No.: 12/968,834

(22) Filed: Dec. 15, 2010

(65) Prior Publication Data

US 2012/0158887 A1 Jun. 21, 2012

(51) Int. Cl.
*G06F 15/173* (2006.01)
*G06F 15/16* (2006.01)
*G06F 9/455* (2006.01)

(52) U.S. Cl.
USPC ............... 709/224; 709/217; 709/242; 718/1

(58) Field of Classification Search
None
See application file for complete search history.

(56) References Cited

U.S. PATENT DOCUMENTS

| | | | |
|---|---|---|---|
| 8,190,769 B1* | 5/2012 | Shukla et al. | 709/238 |
| 2008/0163207 A1* | 7/2008 | Reumann et al. | 718/1 |
| 2011/0087774 A1* | 4/2011 | Pope et al. | 709/224 |
| 2011/0142053 A1* | 6/2011 | Van Der Merwe et al. | 370/395.1 |
| 2011/0302577 A1* | 12/2011 | Reuther et al. | 718/1 |
| 2012/0054367 A1* | 3/2012 | Ramakrishnan et al. | 709/242 |

* cited by examiner

*Primary Examiner* — Wen-Tai Lin
(74) *Attorney, Agent, or Firm* — Lowenstein Sandler LLP

(57) ABSTRACT

A method and system for managing network notifications when a guest migrates in a virtual machine system. A guest hosted by a computer system migrates from a source hypervisor to a target hypervisor in the computer system. The computer system packetizes multiple network addresses of the guest into a network packet. The target hypervisor then transmits the network packet to network devices coupled to the computer system.

17 Claims, 6 Drawing Sheets

COALESCING NETWORK NOTIFICATIONS FOR LIVE MIGRATION

TECHNICAL FIELD

Embodiments of the present invention relate to a computer system, and more specifically, to management of network addresses in a virtual machine system.

BACKGROUND

A virtual machine system sometimes consists of multiple physical machines and runs multiple hypervisors on a single machine. Each hypervisor can support multiple virtual machines, with each virtual machine running a guest to perform tasks for a user. From time to time a system administrator may want to move ("migrate") a guest from one hypervisor to another for maintenance or performance reasons. The migration may be a "live migration," which means that the guest can be moved without disconnecting its client or application.

When a guest migrates to a different hypervisor, its network location is considered as changed. A changed network location means that the different hypervisor ("target hypervisor") is now responsible for forwarding packets to the guest. Switching components (also referred to as "network devices") in the network to which the target hypervisor is coupled are notified of the guest's new association with the target hypervisor so that the guest can continue to receive packets after migration.

One current approach is to have the source hypervisor send the guest's network addresses to the target hypervisor. In response, the target hypervisor sends one or more notification packets to the network devices, notifying the network devices of the guest's network addresses. Thus, when a network device receives a packet destined for any of these addresses, the network device can forward the packet to the target hypervisor, which then relays the packet to the guest. Conventionally, each notification packet sent from the target hypervisor to the network devices contains one network address of the guest. Since a guest can have multiple different network addresses (e.g., in the tens or hundreds), such notification can take tens or hundreds of packets to complete. These notification packets can burden the network and reduce available bandwidth for normal network traffic.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for live migration of a guest in a virtual machine system. In one embodiment, a guest hosted by a computer system migrates from a source hypervisor to a target hypervisor in the computer system. The computer system packetizes multiple network addresses of the guest into a network packet. The target hypervisor then transmits the network packet to network devices coupled to the computer system.

Throughout the following description, the term "network device" is used to refer to a hardware device, an emulated device in a hypervisor, or a software device that connects either two machines in a network or a machine to a network. Such device includes a network interface card (NIC), a bridge, a switch, a router, etc. It is understood that other network devices may be included. The term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
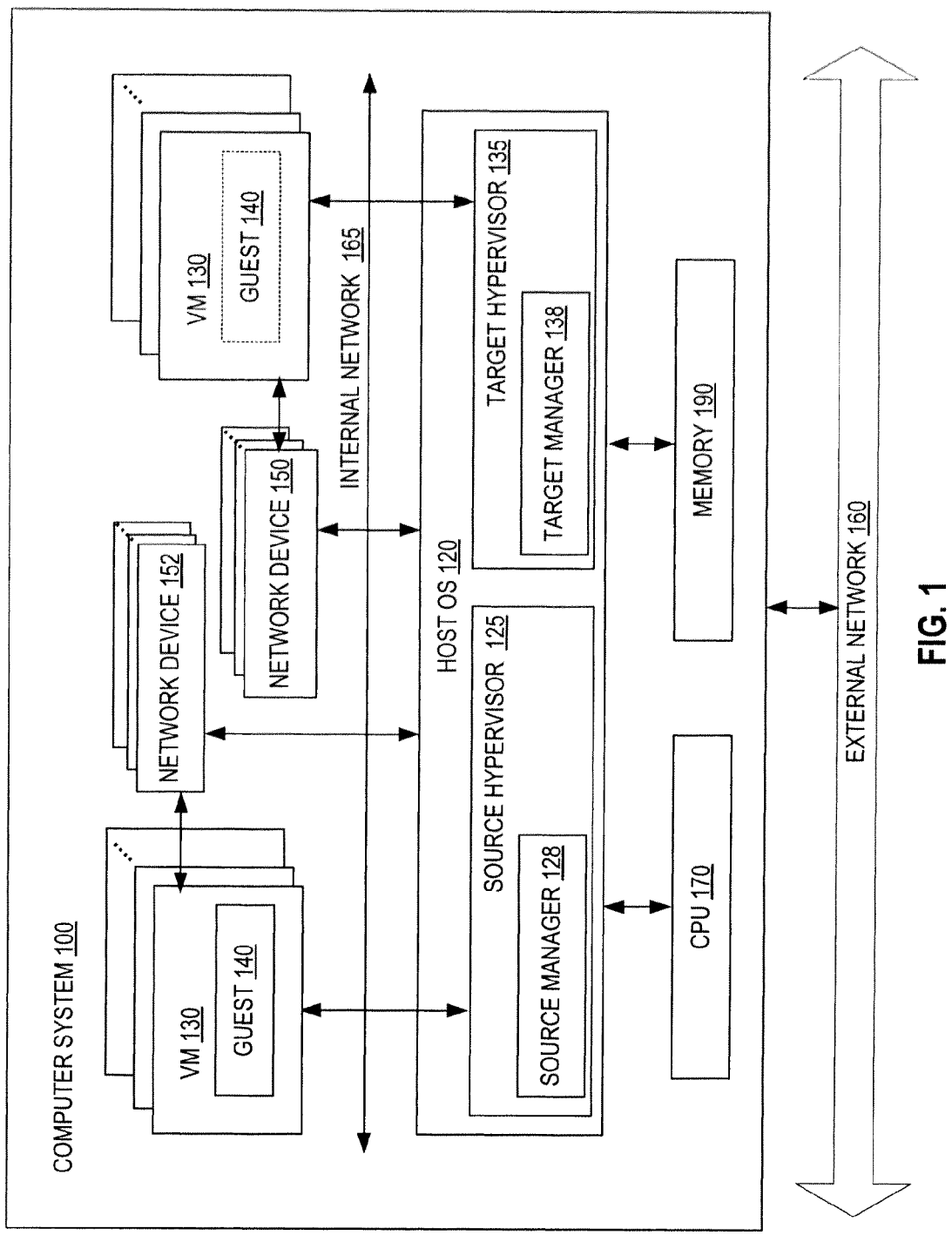
FIG. 1 is a block diagram of a computer system in which a guest migrates from one hypervisor to another hypervisor.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also includes hardware components such as one or more physical central processing units (CPUs) 170, memory 190, and other hardware components. The computer system 100 also runs a host OS 120 to manage system resources. In one embodiment, the computer system 100 runs multiple hypervisors 125, 135 (only two are shown) to virtualize access to the underlying host hardware, making the use of the virtual machine 130 transparent to the guest 140 and the users of the computer system 100. In one embodiment, the hypervisors 125 and 135 may be hypervisors in the user space sharing a single hypervisor kernel (not shown). Each of the hypervisors 125 and 135 may support multiple virtual machines 130.

In one embodiment, the computer system 100 is accessible by remote systems via an external network 160. The external network 160 may be a private network (e.g., a local area network (LAN), a wide area network (WAN), intranet, etc.) or a public network (e.g., the Internet). In some embodiments, the computer system 100 may additionally include an optional internal network 165 for facilitating the communication among the virtual machines 130. In one embodiment, the network addresses on the external network 160 and/or the internal network 165 contain physical network addresses, such as Media Access Control (MAC) addresses. A single guest may also be on multiple physical networks and, therefore, may have multiple physical network addresses. Although the MAC address is used throughout the description to represent the physical network address, it is understood that other physical network addresses may be used for different network protocols.

In one embodiment, a guest can also be on one or more virtual networks. For example, the external network 160 and/or the internal network 165 may be a physical LAN that is partitioned into multiple virtual LANs (VLANs) identified by corresponding VLAN tags. A guest on a VLAN can be reached by a network address that contains a (physical network address, VLAN tag) pair. A single guest may be on multiple VLANs that belong to the same physical network, and, therefore, may have multiple network addresses that share the same physical network address (e.g., MAC address) and different VLAN tags.

Thus, each guest in the computer system 100 may be identified by multiple network addresses, such as: physical network addresses (e.g., MAC addresses), virtual network addresses (e.g., (MAC address, VLAN) tag) pairs, a combination of the above, etc.

In one embodiment, one of the guests (e.g., the guest 140) may migrate from one hypervisor (e.g., the source hypervisor 125) to another hypervisor (e.g., the target hypervisor 135) during operation of the computer system 100 (the guest 140 after the migration is shown as a dotted box). The migration may be a "live migration," which means that the guest 140 can be moved without disruption to the users of the virtual machines 130. In one embodiment, the migration changes the association between the guest 140 and the hypervisors 125 and 135, but does not change the network addresses of the guest 140.

In one embodiment, one or more network devices 152 and 150 are coupled to the computer system 100 via the networks 160 and 165. The network devices 152 are used by the source hypervisor 125 and the network devices 150 are used by the target hypervisor 135 to forward packets. Some of the network devices 152 and 150 may coexist on the same physical hardware component. Although not shown in the embodiment of FIG. 1, some of the network devices 152 and 150 may be internal to the computer system 100 and some of them may be external to the computer system 100. Examples of the network devices include switches, bridges, network interface cards (NICs), routers, and any network components that track the transmission of packets on the networks 160 and 165. The network devices may be hardware devices, emulated devices in the source hypervisor 125, software devices, or a combination of the above.

According to one embodiment of the present invention, the target hypervisor 135 includes a target manager 138 to manage the network location of the guests associated with the target hypervisor 135. Similarly, the source hypervisor 125 includes a source manager 128 to manage the network location of the guests associated with the source hypervisor 125. After the guest 140 migrates from the source hypervisor 125 to the target hypervisor 135, network devices 150 need to be informed of the network addresses of the guest 140, as well as the new association between the guest 140 and the target hypervisor 135. Thus, when the network device 150 receives a packet destined for the guest 140, the network device 150 can properly forward the packet to the guest 140 through the target hypervisor 135. In one embodiment, the target hypervisor 135 may notify all of the network devices 150 in the networks 160 and 165 of the guest's network addresses, because the target hypervisor 135 may not know all of the network devices 150 that participate in the packet forwarding chain for the guest 140.

Embodiments of the present invention enable the target hypervisor 135 to efficiently notify the network devices 150 of the guest's network addresses. In one embodiment, the target hypervisor 135 receives a list of the guest's network addresses from the source hypervisor 125 after the guest 140 migrates to the target hypervisor 135. The target hypervisor 135 then forwards the address list to all of the network devices 150 that are in one or more of the networks 160 and 165, notifying the network devices 150 of the new location of the guest 140. In one embodiment, the new location of the guest 140 is recorded in an address forwarding table of the network devices 150.

Figure 2:
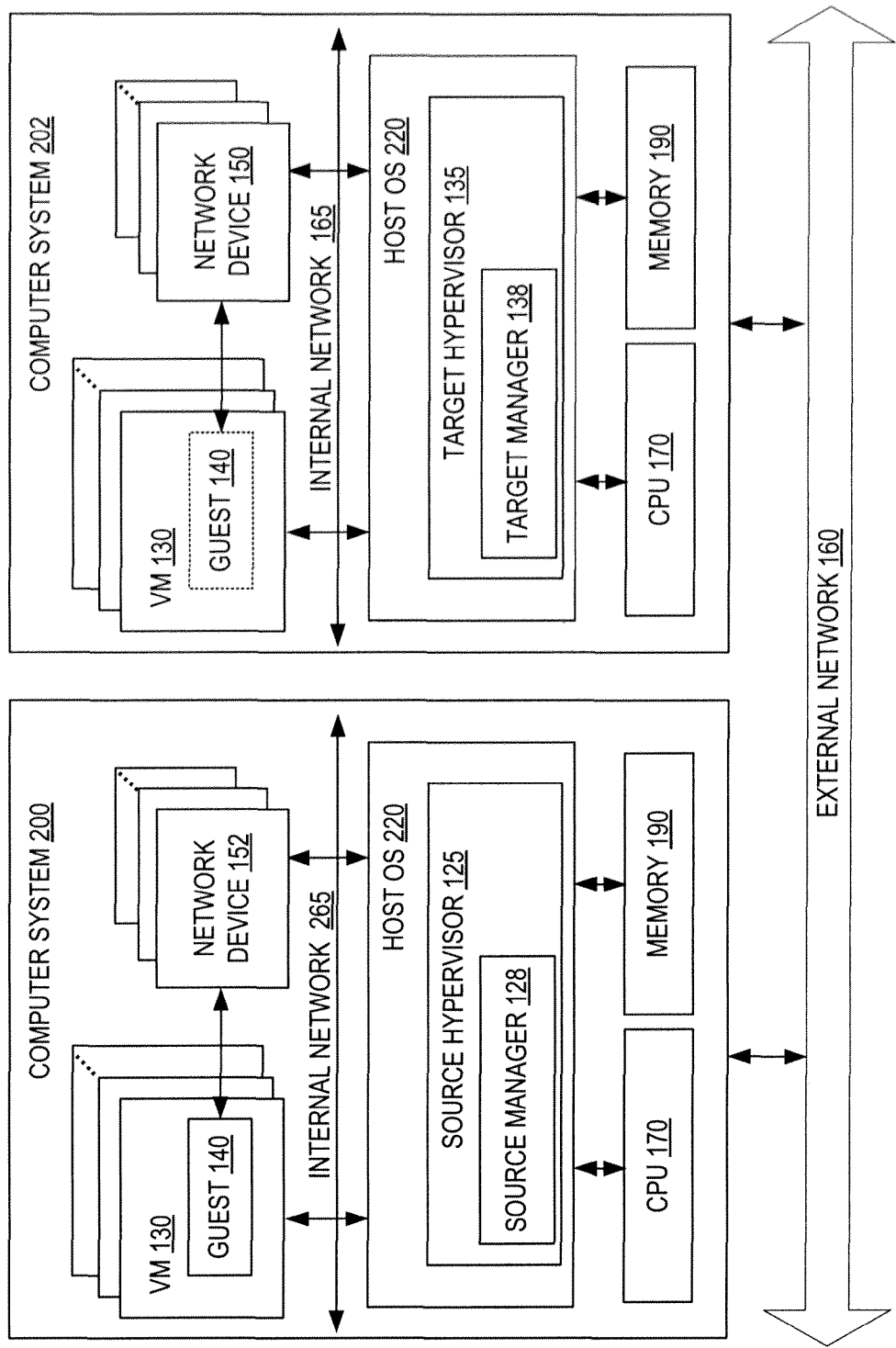
FIG. 2 is a block diagram of two computer systems in which a guest migrates from one computer system to another computer system.

FIG. 2 is a block diagram that illustrates another environment in which embodiments of the present invention may operate. In this environment, the guest 140 can migrate from one computer system 200 to another computer system 202 during operation of the computer systems 200 and 202 without disruption to the users of the virtual machines 130. Similar to the computer system 100, each of the computer systems 200 and 202 may be a server, a workstation, a personal computer (PC), a mobile phone, a palm-sized computing device, a personal digital assistant (PDA), etc. Each of the computer systems 200 and 202 runs a host OS 220 to manage system resources. In one embodiment, the computer systems 200 and 202 may run the same kind or different host operating systems. Each of the virtual machines 130 on the computer systems 200 and 202 may also run the same or different guest operating systems. The computer systems 200 and 202 may also include the same kind or different CPUs 170 and memory 190.

In one embodiment, each of the computer systems 200 and 202 runs one or more hypervisors (only one hypervisor is shown) to virtualize access to the underlying host hardware. When the guest 140 migrates from the computer system 200 to the computer system 202 during operating of the computer systems 200 and 202, the guest 140 becomes disassociated from the source hypervisor 125 and associated with the target hypervisor 135 (the guest 140 after the migration is shown as a dotted box). Similar to the embodiment of FIG. 1, the migration changes the association between the guest 140 and the hypervisors 125 and 135 but does not change the network addresses of the guest 140.

In one embodiment, one or more network devices 152 and 150 are coupled to the computer systems 200 and 202, respectively. In the embodiment of FIG. 2, the network devices 152 and 150 are shown to be internal to the computer systems 200 and 202, respectively. In alternative embodiments, one or more of the network devices 152 and 150 may be external to the computer system 200 and 202. The network devices 152 and 150 may include a switch, a bridge, a network interface card (NIC), a router, and any network component that tracks the transmission of packets on the networks 160, as well as networks 265 and 165, respectively. Each of the network devices 152 and 150 may be a hardware device, an emulated device in the source hypervisor 125 and target hypervisor 135, respectively, a software device, or a combination of the above.

According to one embodiment of the present invention, the target hypervisor 135 receives a list of the guest's network addresses from the source hypervisor 125 after the guest 140 migrates to the target hypervisor 135. The target hypervisor 135 then forwards the address list to all of the network devices 150 that are in one or more of the networks 160 and 165, notifying the network devices 150 of the new location of the guest 140. The network addresses in the address list may include one or more physical network addresses (e.g., MAC addresses), one or more virtual network addresses (e.g., (MAC address, VLAN tag) pairs), or a combination of both. It is understood that other network addresses may be used with different network protocols.

Figure 3:
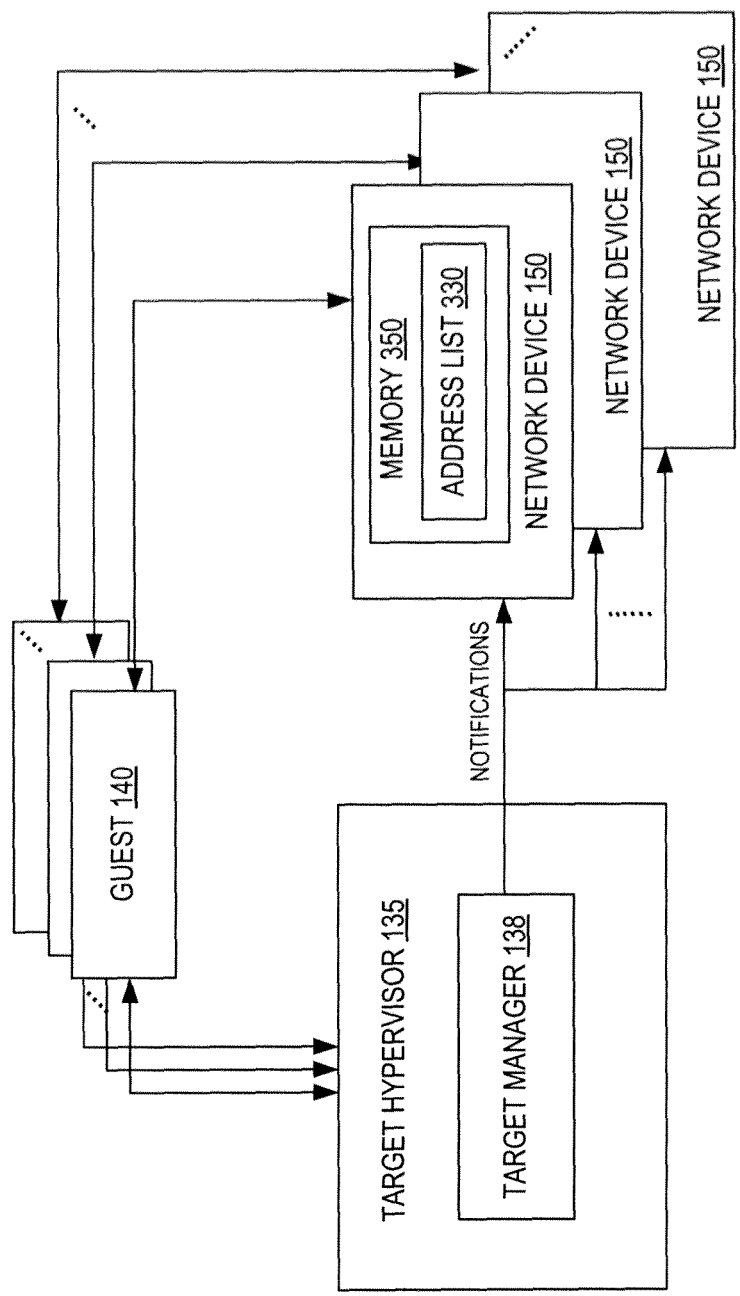
FIG. 3 illustrates an embodiment of a target hypervisor and network devices.

FIG. 3 is a block diagram that illustrates an embodiment of the target hypervisor 135 and the network devices 150. The target hypervisor 135 uses the target manager 138 to notify the network devices 150 of the guest's network addresses. The notification may be sent in one or more network packets (e.g., Internet Protocol (IP) packets), with each network packet containing multiple network addresses of the guest 140. The notification may be sent by broadcasting or multicasting. After receiving the notification, each of the network devices 150 stores a list 330 of network addresses in its memory 350.

In one embodiment, the target hypervisor 135 may packetize multiple network addresses of the guest 140 in one network packet. The target hypervisor 135 may also encode some or all of the network addresses in the network packet. The packetization can increase the amount of information contained in each network packet. As a result, the target hypervisor 135 can send fewer network packets and reduce the load on the networks.

Figure 4:
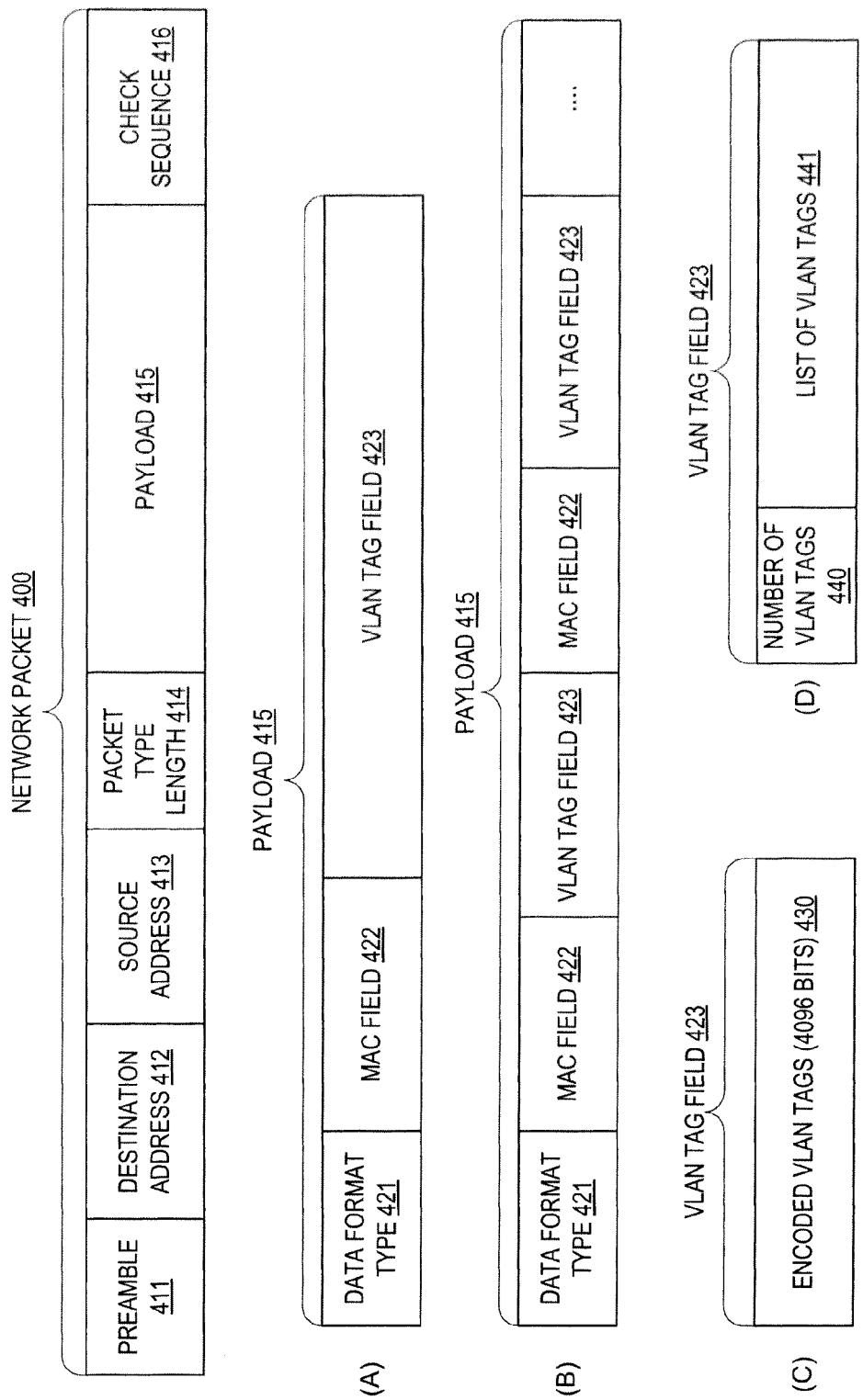
FIG. 4 is a diagram illustrating embodiments of a network packet for sending notification.

FIG. 4 illustrates examples of a network packet 400 (also referred to as a "notification packet") that can be used by the target hypervisor 135 to send notification. In one embodiment, the network packet 400 includes a preamble 411, a destination address 412, a source address 413, a packet type and length field 414, a payload 415 and a check sequence 416. The network packet 400 may be an IP packet 400, or may be formatted according to other network protocols. The payload 415 contains the network addresses of the guest 140.

One example of a data format in the payload 415 is shown in (A), which includes a data format type 421, a MAC field 422 and a VLAN tag field 423. Each MAC field 422 and VLAN tag field 423 may contain one or more MAC addresses and one or more VLAN tags, respectively. Thus, if a guest has multiple MAC addresses, and one of the MAC addresses is shared by multiple VLANs, the MAC field 422 may contain a list of MAC addresses and the last MAC address in the list may be used in multiple (MAC address, VLAN tag) pairs.

Another example of a data format in the payload 415 is shown in (B), which includes the data format type 421 followed by interleaving MAC fields 422 and VLAN tag fields 423. Each MAC field 422 and VLAN tag field 423 may contain one or more MAC addresses and one or more VLAN tags, respectively. Thus, if a guest has multiple MAC addresses and each MAC address is used to form multiple VLANs, each MAC field 422 may contain a MAC address and each VLAN tag field 423 may contain multiple VLAN tags that share the same MAC address that precedes those VLAN tags. In one scenario, a guest may also have additional MAC addresses that are not associated with any VLANs. In this scenario, some of the MAC field 422 may contain multiple MAC addresses or the payload 415 may include an additional MAC field 422 that is not associated with VLAN tag field 423.

In one embodiment, the target hypervisor 135 may use the data format type 421 to indicate the data format for arranging the network addresses of the guest 140 (e.g., as in (A) or in (B)). In an alternative embodiment, the target hypervisor 135 may use a predetermined fixed data format in the payload 415 for all of the network packets it sends. In this scenario, it is unnecessary to include the data format type 421 in the payload 415.

An example of the VLAN tag field 423 is shown in (C), which contains 4096 bits with each bit indicating whether a corresponding VLAN tag is used by the guest 140. According to IEEE 802.1Q, a VLAN tag can be identified by a 12-bit VLAN identifier. Thus, the 4096 bits can represent all of the $2^{12}$ possible VLAN identifiers, with each bit corresponding to one unique VLAN identifier. Thus, instead of using 12 bits for each VLAN tag, the encoding scheme shown in (C) allows a fixed number of bits (e.g., 4096 bits) to be used to represent all of the VLAN tags used by the guest 140. If the guest 140 is on a large number of VLANs (e.g., in the hundreds), using the bit-encoded VLAN tag field 430 in (C) can efficiently reduce the amount of data in a notification packet.

An example of the VLAN tag field 423 is shown in (D), which contains a list of VLAN tags 441 and the number of VLAN tags 440 in the list 441. In one embodiment, each VLAN tag in the list 441 may be transmitted as is (e.g., as a 12-bit VLAN identifier). This embodiment may be used when the guest 140 is on a small number of VLANs (e.g., less than two hundred).

It is understood that the fields shown in FIG. 4 can be arranged in a different order and are not limited to the embodiments as shown. For example, the VLAN tag field 423 may precede the MAC field 422 in the payload 415.

Figure 5:
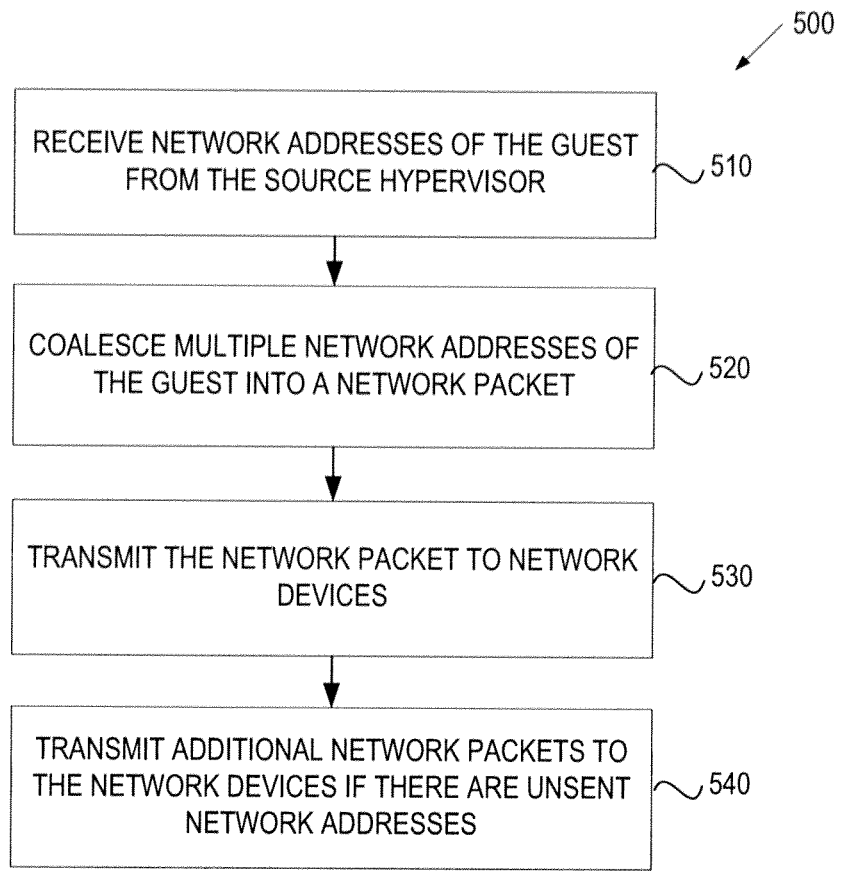
FIG. 5 is a flow diagram of one embodiment of a method for managing network notifications when a guest migrates to a target hypervisor.

FIG. 5 is a flow diagram illustrating one embodiment of a method 500 for sending a notification that contains coalesced network addresses of a guest that undergoes a live migration. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the target manager 138 of the target hypervisor 135 of FIGS. 1-3.

Referring to FIG. 5, in one embodiment, the method 500 begins when the target manager 138 receives network addresses of the guest 140 that migrates from the source hypervisor 125 to the target hypervisor 135 (block 510). The target manager 138 places ("packetizes") multiple network addresses of the guest 140 into a network packet (block 520). In one embodiment, the coalescing can be performed by transmitting multiple virtual network addresses of the guest 140 in one network packet, the multiple virtual network addresses represented by one physical network address (e.g., a MAC address) and multiple tags (e.g., VLAN tags) identifying corresponding virtual networks that share the one physical network address. For example, the target manager 138 can transmit only one MAC address for the (MAC address, VLAN tag) pairs that share the same MAC address. Additionally or alternatively, the coalescing can be performed by bit-encoding a large number (e.g., in the hundreds) of VLAN tags in one VLAN tag field 423 (as shown in the example (C) of FIG. 4). The target hypervisor 135 then transmits the network packet to the network devices 150 (block 530). If there are additional network addresses of the guest 140 that have not been sent to the network devices 150, the target hypervisor 135 will repeat the operation of blocks 520 and 530 to packetize and transmit these additional network addresses to the network devices (block 540).

Figure 6:
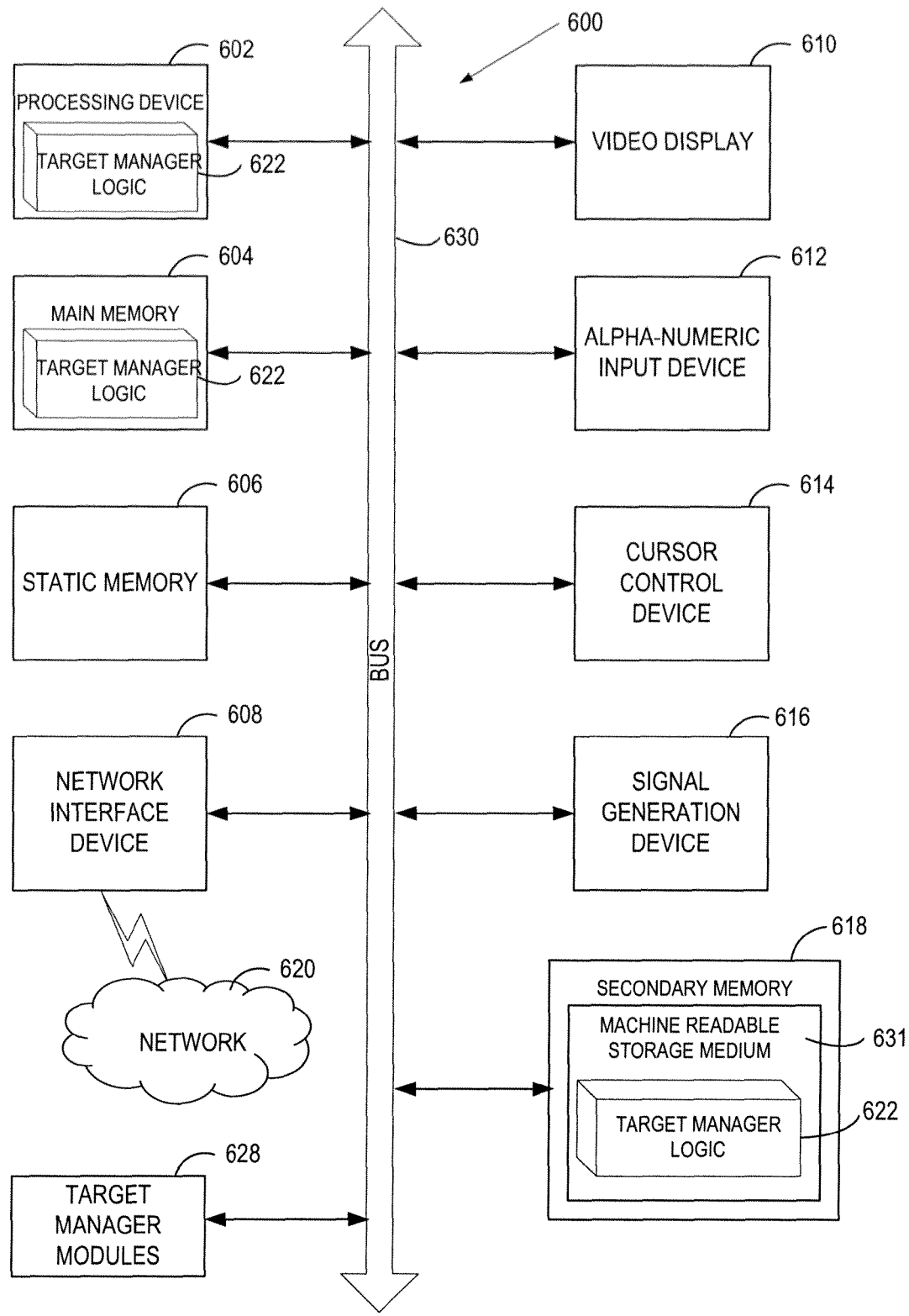
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute target manager logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., target manager logic 622) embodying any one or more of the methodologies or functions described herein (e.g., the target manager 138 of FIGS. 1-3). The target manager logic 622 may also reside, completely or at least partially, within the main memory 604 and/or within the processing device 602 during execution thereof by the computer system 600; the main memory 604 and the processing device 602 also constituting machine-readable storage media. The target manager logic 622 may further be transmitted or received over a network 620 via the network interface device 608.

The machine-readable storage medium 631 may also be used to store the target manager logic 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include source manager modules 628 for implementing the functionalities of the target manager 138 of FIGS. 1-3. The module 628, components and other features described herein (for example in relation to FIGS. 1-3) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "migrating", "packetizing", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   receiving, by a computer system, a plurality of network addresses of a guest that migrates from a source hypervisor to a target hypervisor in the computer system;
   packetizing, by the computer system, the network addresses of the guest into a network packet; and
   transmitting, by the computer system, a plurality of virtual network addresses of the guest in the network packet from the target hypervisor to network devices coupled to the computer system, the plurality of virtual network addresses represented by one physical network address and a plurality of tags identifying corresponding virtual networks that share the one physical network address.

2. The method of claim 1, further comprising:
   transmitting a Media Access Control (MAC) field and a Virtual Local Area Network (VLAN) tag field in a payload of the network packet, the MAC field containing one or more MAC addresses and the VLAN tag field containing one or more VLAN tags.

3. The method of claim 1, further comprising:
   transmitting interleaving MAC fields and VLAN tag fields in a payload of the network packet, each MAC field containing one or more MAC addresses and each VLAN tag field containing one or more VLAN tags.

4. The method of claim 1, wherein the network packet comprises a VLAN tag field, each bit of the VLAN tag field indicating whether or not a corresponding VLAN tag is used by the guest.

5. The method of claim 1, wherein the network packet comprises a VLAN tag field that comprises a list of VLAN tags and the number of VLAN tags in the list.

6. The method of claim 1, wherein each network packet comprises a data format type to indicate a format of the network addresses in the network packet.

7. A system, comprising:
   a computer system to host a target hypervisor, the target hypervisor to packetize a plurality of network addresses of a guest into a network packet for transmission to network devices coupled to one or more networks after the guest migrates to the target hypervisor from a source hypervisor,
   wherein the network packet comprises a plurality of virtual network addresses of the guest, the plurality of virtual network addresses represented by one physical network address and a plurality of tags identifying corresponding virtual networks that share the one physical network address; and
   memory coupled to the network devices to store the network addresses of the guest.

8. The system of claim 7, wherein the network packet comprises a Media Access Control (MAC) field and a Virtual Local Area Network (VLAN) tag field in a playload of the network packet, the MAC field to contain one or more MAC addresses and the VLAN tag field to contain one or more VLAN tags.

9. The system of claim 7, wherein the network packet comprises interleaving MAC fields and VLAN tag fields in a payload of the network packet, each MAC field to contain one or more MAC addresses and each VLAN tag field to contain one or more VLAN tags.

10. The system of claim 7, wherein the network packet comprises a VLAN tag field, each bit of the VLAN tag field to indicate whether or not a corresponding VLAN tag is used by the guest.

11. The system of claim 7, wherein the network packet comprises a VLAN tag field that comprises a list of VLAN tags and the number of VLAN tags in the list.

12. A non-transitory computer readable storage medium including instructions that, when executed by a processing device, cause the processing device to perform operations, comprising:
    receiving, by the processing device, a plurality of network addresses of a guest that migrates from a source hypervisor to a target hypervisor in a computer system;
    packetizing, by the processing device, the network addresses of the guest into a network packet; and
    transmitting, by the processing device, a plurality of virtual network addresses of the guest in the network packet from the target hypervisor to network devices coupled to the computer system, the plurality of virtual network addresses represented by one physical network address and a plurality of tags identifying corresponding virtual networks that share the one physical network address.

13. The computer readable storage medium of claim 12, the operations further comprising:
    transmitting a Media Access Control (MAC) field and a Virtual Local Area Network (VLAN) tag field in a payload of the network packet, the MAC field containing one or more MAC addresses and the VLAN tag field containing one or more VLAN tags.

14. The computer readable storage medium of claim 12, the operations further comprising:
    transmitting interleaving MAC fields and VLAN tag fields in a payload of the network packet, each MAC field containing one or more MAC addresses and each VLAN tag field containing one or more VLAN tags.

15. The computer readable storage medium of claim 12, wherein the network packet comprises a VLAN tag field, each bit of the VLAN tag field indicating whether or not a corresponding VLAN tag is used by the guest.

16. The computer readable storage medium of claim 12, wherein the network packet comprises a VLAN tag field that comprises a list of VLAN tags and the number of VLAN tags in the list.

17. The computer readable storage medium of claim 12, wherein each network packet comprises a data format type to indicate a format of the network addresses in the network packet.

* * * * *